(12) United States Patent
Kinugasa et al.

(10) Patent No.: US 8,193,726 B2
(45) Date of Patent: Jun. 5, 2012

(54) FLUORESCENT LIGHT TEMPERATURE SENSOR

(75) Inventors: Seiichiro Kinugasa, Tokyo (JP);
Atsushi Kato, Tokyo (JP); Shunji Ichida, Tokyo (JP)

(73) Assignee: Yamatake Corporation, Tokyo (JP)

(*) Notice: Subject to any disclaimer, the term of this patent is extended or adjusted under 35 U.S.C. 154(b) by 409 days.

(21) Appl. No.: 12/424,703

(22) Filed: Apr. 16, 2009

(65) Prior Publication Data

US 2009/0261751 A1    Oct. 22, 2009

(30) Foreign Application Priority Data

Apr. 21, 2008 (JP) ................ 2008-110551

(51) Int. Cl.
*H05B 41/292* (2006.01)

(52) U.S. Cl. ........ 315/291; 313/639; 313/633; 315/307; 315/224

(58) Field of Classification Search ............ 315/312, 315/360, 362, 307, 291, 178, 179, 149, 153, 315/154, 302, 208; 362/285, 800; 374/120, 374/121, 130–132, 161–162, 4, 57, 45

See application file for complete search history.

(56) References Cited

U.S. PATENT DOCUMENTS

| 5,107,445 A | 4/1992 | Jensen et al. |
| 6,204,915 B1* | 3/2001 | Persegol et al. ............ 356/73.1 |
| 2004/0105264 A1* | 6/2004 | Spero ......................... 362/276 |

FOREIGN PATENT DOCUMENTS

JP    2002-071473 A    3/2002

* cited by examiner

*Primary Examiner* — Shawki S Ismail
*Assistant Examiner* — Christopher Lo
(74) *Attorney, Agent, or Firm* — McDermott Will & Emery LLP (57) ABSTRACT

A fluorescent light temperature sensor for producing a temperature signal from a fluorescent light of an optically stimulated fluorescent material is provided with: an LED for projecting light onto the fluorescent material; a driving circuit for driving the light projecting element; a photo diode for receiving the fluorescent light that is emitted from the fluorescent material; a signal processing circuit for producing the temperature signal from the output signal from the photo diode; and an APC circuit for controlling the driving of the driving circuit so as to maintain a uniform light projecting intensity from the LED based on the output signal of the photo diode.

7 Claims, 7 Drawing Sheets

FLUORESCENT LIGHT TEMPERATURE SENSOR

CROSS REFERENCE TO PRIOR APPLICATIONS

The present application claims priority under U.S.C. §119 to Japanese Patent Application No. 2008-110551, filed Apr. 21, 2008. The content of the application is incorporated herein by reference in its entirety.

TECHNOLOGY OF THE INVENTION

The present invention relates to a fluorescent light temperature sensor for producing a temperature signal from a fluorescent light of an optically stimulated fluorescent material.

BACKGROUND ART

As illustrated in Japanese Unexamined Patent Application Publication 2002-71473 there is a known fluorescent light temperature sensor provided with a fluorescent material, a light projecting element for projecting light onto the fluorescent material, a light receiving element for receiving light from the fluorescent material, a light splitting device (a half mirror), and a calculating/controlling unit.

In this type of fluorescent light temperature sensor, light from the light projecting element is projected through the light splitting device onto the fluorescent material. The light from the fluorescent material, which is optically stimulated thereby, is reflected to the light receiving element side by the light splitting device. The temperature in the temperature measurement environment in which the fluorescent material exists is calculated by the processing unit based on the variations in luminous flux (luminosity) from the fluorescent material, detected by the light receiving element, or in other words, based on the decay characteristics of the fluorescent light.

Note that the light projecting element will deteriorate over time, due to the use thereof, causing the intensity of the projected light to decline gradually. Because of this, when it is no longer possible to obtain a predetermined projected light intensity, or when there is a failure in the ignition of the light due to deterioration, then the light projecting element is replaced.

However, the conventional fluorescent light temperature sensor has had the following problems because the deterioration of the light projecting element over time has not been taken into consideration.

Firstly, when the light projection intensity of the light projecting element has declined, it is difficult to perform the temperature measurement accurately based on the variation in the luminous flux of the fluorescent light. When the fluorescent light temperature sensor has a defined correlation between the decay characteristics of the fluorescent light luminous flux, then, for the decay characteristics, the fluorescent light temperature sensor, given the design of the sensor (having to do with the sampling period of the output signal that is outputted from the light receiving element, the processing period in the calculating/controlling unit, and the like), looks for the intensity of the fluorescent light to reach a predetermined level. However, when the intensity of the projected light by the light projecting element has declined, it becomes impossible for the fluorescent material to transition to a state that is stimulated to a predetermined level by the beam from the light projecting element, causing a decline in the intensity of the fluorescent light. Because of this, there is also a decline in the accuracy of the temperature measurement.

Secondly, when it is not possible to obtain the predetermined intensity of the projected light from the light projecting element, or when there is a non-ignition failure due to deterioration, it becomes completely impossible to perform a measurement using the temperature sensor. Because of this, the system or device in which the sensor is incorporated becomes unable to perform operations based on the temperature, causing unanticipated situations for the user. In order to avoid these situations, one may consider replacing the light projecting element on a periodic scheduled basis; however, this is not practical because the deterioration over time will vary depending on the conditions of use.

In contemplation of the situation set forth above, the object of the present invention is to provide a fluorescent light temperature sensor capable of maintaining functionality, as a temperature sensor, in accordance with the deterioration of the light projecting element over time.

SUMMARY OF THE INVENTION

The fluorescent light temperature sensor as set forth in an embodiment is a fluorescent light temperature sensor for generating a temperature signal from a fluorescent light from an optically stimulated fluorescent material, including: a light projecting element for projecting light onto the fluorescent material; a driving circuit for driving the light projecting element; a light receiving element for receiving fluorescent light emitted from the fluorescent material; a signal processing circuit for generating a temperature signal from the output signal of the light receiving element; and a controlling circuit for controlling the driving of the driving circuit through sending a control signal to the driving circuit so as to maintain a uniform intensity for the fluorescent light of the fluorescent material based on the output signal from the light receiving element.

Given the fluorescent light temperature sensor as set forth above, the light from the fluorescent material that has been optically stimulated by the light from the light projecting element is received by the light receiving element. At this time, the controlling circuit controls the driving circuit for driving the light projecting element, based on an output signal from the light receiving element, so as to cause the intensity of the fluorescent light from the fluorescent substance material to be uniform. Because of this, even when there is a reduction in the intensity of the fluorescent light of the fluorescent material accompanying a reduction in the intensity of the projected light due to the deterioration of the light projecting element over time, or in other words, accompanying a reduction in the intensity of the excitation light that optically stimulates the fluorescent material, the light projecting element is driven so as to compensate therefor, preventing a reduction in the accuracy of the measurement of the temperature, making it possible to maintain the functionality that is desired in the fluorescent light temperature sensor.

The fluorescent light temperature sensor as set forth in another embodiment is the fluorescent light temperature sensor as set forth above, wherein: the driving circuit drives the light projecting element so as to project light at uniform intervals; and the controlling circuit controls the intensity of the projected light in one cycle based on the intensity of the fluorescent light of the fluorescent materials due to the projected light in the previous cycle.

Given the fluorescent light temperature sensor as set forth above, when the fluorescent material is optically stimulated with a uniform light projecting period and the fluorescent light therefrom is received by the light receiving element, the driving of the light receiving element in one cycle is based on the intensity of the fluorescent light of the fluorescent material due to the projected light of the previous cycle. Doing so enables the driving of the light projecting element in a subsequent cycle to be performed so as to compensate in a case wherein the intensity of the projected light in the previous cycle has diminished so as to cause a decline in the intensity of the fluorescent light of the fluorescent material that is optically stimulated thereby. This enables the functionality of the temperature sensor to be maintained by performing compensation even when there is a temporary decline in the intensity of the projected light in accordance with the deterioration of the light projecting element over time.

The fluorescent light temperature sensor according to a further embodiment is a fluorescent light temperature sensor as set forth above having evaluating means for evaluating the service life of the light projecting element in advance based on a control signal from the controlling circuit.

Given the fluorescent light temperature sensor as set forth in the above embodiments, the deterioration of the light projecting element may continue as long as the light projecting element is usable, even if there is temporary compensation by the controlling circuit, when there is a temporary decrease in the intensity of the projected light by the light projecting element. However, the degree to which the deterioration of the light projecting element has advanced can be evaluated in advance based on the control signal that is outputted from the controlling circuit to the driving circuit in order to compensate for the deterioration of the light projecting element over time, making it possible to avoid a situation wherein the light projecting element suddenly becomes unusable, doing so through evaluating the service life thereof in advance. That is, evaluating the service life of the light projecting element in advance can provide a trigger for replacement, suggesting, to the user, the timing with which the light projecting element is to be replaced, making it possible to avoid situations wherein the temperature sensor unexpectedly becomes incapable of measurements, enabling the functionality of the temperature sensor to be maintained.

The fluorescent light temperature sensor according to an embodiment is a fluorescent light temperature sensor as set forth above, wherein: the evaluating means evaluate the service life of the light projecting element in advance based on the frequency of outputting of the control signal per unit time.

The fluorescent light temperature sensor as set forth in the above embodiments increases the output frequency of the control signal that is outputted to the driving circuit from the controlling circuit when the deterioration of the light projecting element advances over time to cause the intensity of the projected light to decline at a uniform frequency. Given this, it is possible for the evaluating means to evaluate the service life of the light projecting element in advance through the frequency of the outputting of the control signal that is outputted from the controlling circuit to the driving circuit (for example, depending on the cumulative output count or the frequency of outputting per unit time). This enables the evaluation of the service life of the light projecting element to be performed easily through counting the number of times that the control signal is outputted, enabling the functionality of the temperature sensor to be maintained based thereon, as described above.

The fluorescent light temperature sensor according to another embodiment is a fluorescent light temperature sensor as set forth above, wherein the evaluating means evaluate the service life of the light projecting element in advance based on a controlled variable expressed by the control signal.

Given the fluorescent light temperature sensor as set forth above, when the deterioration of the light projecting element advances over time, causing the magnitude of the reduction in the intensity of the projected light to be large, a controlled variable that is expressed by the control signal that is outputted to the driving circuit from the controlling circuit in order to perform the compensation therefor becomes larger. Given this, the evaluating means are able to evaluate the service life of the light projecting element in advance using the controlled variable that is represented by the control signal that is outputted to the driving circuit from the controlling circuit. This enables the evaluation of the service life of the light projecting element in advance to be performed easily, enabling the functionality as a temperature sensor to be maintained based thereon, as described above.

DETAILED DESCRIPTION OF THE INVENTION

A fluorescent light temperature sensor as set forth in a first example of embodiment according to the present invention will be explained in reference to FIG. 1 through FIG. 7.

Figure 1:
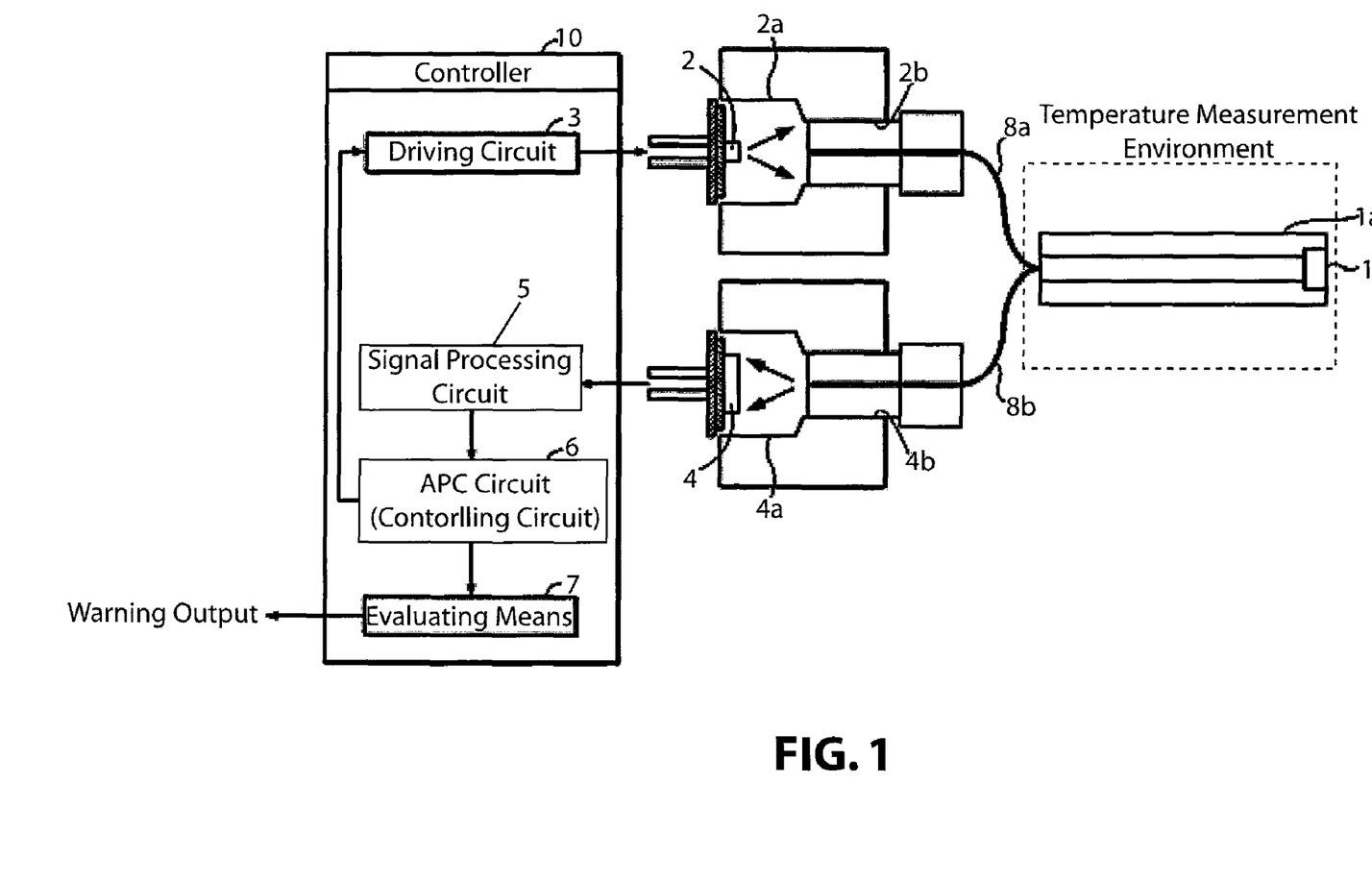
FIG. 1 is a diagram illustrating a structure for a fluorescent light temperature sensor as set forth in the present examples of embodiment.

The overall structure of the fluorescent light temperature sensor according to the present example of embodiment will be explained in reference to FIG. 1. The fluorescent light temperature sensor comprises: a fluorescent material 1 that exhibits fluorescent properties that vary depending on the temperature; an LED 2 as a light projecting element for projecting light onto the fluorescent material 1; a driving circuit 3 for driving the LED 2; a photo diode 4, as a light receiving element for receiving the fluorescent light that is emitted by the fluorescent material 1; a signal processing circuit 5 for generating and outputting a temperature signal corresponding to an output signal from the photo diode 4; an APC (Automatic Power Control) circuit 6, as a controlling circuit for controlling the intensity of the light projected by the LED 2, connected to the signal processing circuit 5 and the driving circuit 3; and evaluating means 7 for evaluating the service life of the LED 2 in advance based on an output signal that is outputted from the APC circuit 6 to the driving circuit 3.

The fluorescent light temperature sensor further comprises: a light projecting optical fiber 8a for transmitting light from the LED 2 to the fluorescent material 1; and a light receiving optical fiber 8b for transmitting the fluorescent light of the fluorescent material 1 to the photo diode 4.

The fluorescent material 1 is disposed within a protecting tube 1a that is provided so as to cover one end portion of the light projecting and light receiving optical fibers 8a and 8b, opposite from the core portions of the optical fibers 8a and 8b.

The LED 2 is disposed within an LED module 2a, and is a light-emitting diode that has, for example, a blue color system wavelength as the light-emission color thereof. The LED module 2a has a connector portion 2b that connects to the light projecting optical fiber 8a, where the light projecting optical fiber 8a that is connected through the connector portion 2b is located so that the core portion thereof is within the scope of the directional properties of the LED 2.

The driving circuit 3 applies, to the LED 2, a pulsed electric current with a specified magnitude and a specified light-emission time for the driving electric current for the light emission of the LED 2 as required by the controlling circuit 6. For example, the driving circuit 3 may apply, to the LED 2, a pulsed electric current of a specific magnitude to cause the interval of light emission of the LED 2 in a single measurement cycle to be any time between, for example, 1 ms and 500 ms, depending on the fluorescent material 1. Note that when it comes to the light emission interval of the LED 2, this may be determined in detail in accordance with the physical properties of the fluorescent material 1, and in accordance with the temperature band in which the measurement is to be performed. That is, when using a fluorescent material with a short fluorescent service life, it is possible to obtain an adequate intensity of fluorescent light even if the light emission interval is short, and thus the light emission interval of the LED 2 should be set so as to be short. Additionally, because the fluorescent service life is typically shortened at high temperatures, light emission interval of the LED 2 can be shortened. Setting the light emission interval so as to be short, within the range that can achieve a predetermined objective, by taking these factors into consideration can be envisioned easily to ultimately extend the service life of the LED 2, which is desirable.

The photo diode 4 is disposed in a photo diode module 4a, and measures the luminous flux (the brightness) of the light that is produced. The photo diode module 4a has a connector portion 4b that is connected to the light receiving optical fiber 8b, where the light receiving portion of the photo diode 4 is positioned within the range of the aperture angle of the light receiving optical fiber 8b that is connected through the connector portion 4b.

The signal processing circuit 5 measures the decay characteristics of the fluorescent light of the fluorescent material 1 measured by the photo diode 4, and in particular, measures the fluorescent light relaxation time. Specifically, the signal processing circuit 5 calculates and outputs the temperature of the temperature measurement environment wherein the fluorescent material 1 is found, from an expression (including a data table, a map, and the like) for the relationship between the fluorescent light relaxation time and the fluorescent material 1 which has been established in advance.

The APC circuit 6 controls the driving of the driving circuit 3 so as to maintain a uniform intensity for the projected light from the LED 2, based on the output signal of the photo diode 4. Specifically, the APC circuit 6 monitors the output signal of the photo diode 4 through the signal processing circuit 5. The intensity of the projected light of the LED 2 due to the pulsed electric current in the previous cycle is obtained as the initial intensity of light emission of the fluorescent material 1, which is stimulated by the projected light (that is, the intensity of the light emitted at the beginning of the measurement), and performs feedback control to the driving circuit 3 so that this intensity will be a specific value.

Note that when the LED 2 is driven with a uniform intensity for the projected light, the APC circuit 6 outputs a normal output signal to the driving circuit 3, but when it is necessary to increase the driving electric current for the LED 2 according to a control rule, a control signal that is in accordance with the amount of compensation is outputted as the output signal instead of the normal output signal.

The evaluating means 7 monitor the output signal that is outputted from the APC circuit 6 to the driving circuit 3, to evaluate the service life of the LED 2 in advance based on the frequency (the number of cycles per unit time) and on the magnitude of the control signal that is included in the output signal.

Note that in the present form of embodiment, the circuits 3, 5, and 6 are each structured from digital circuits, where the individual circuits 3, 5, and 6 and the evaluating means 7 are provided in a controller 10 that is structured from a microcomputer, or the like. The individual circuits 3, 5, and 6, and the evaluating means 7 that constitute the controller 10 maybe structured from hardware such as a CPU, a ROM, and a RAM, and the like, where these individual circuits 3, 5, 6 and the means 7 maybe structured through shared hardware, or all or part of these circuits 3, 5, and 6, and the means 7 may be structured from differing hardware.

(First Example of Embodiment)

Figure 2:
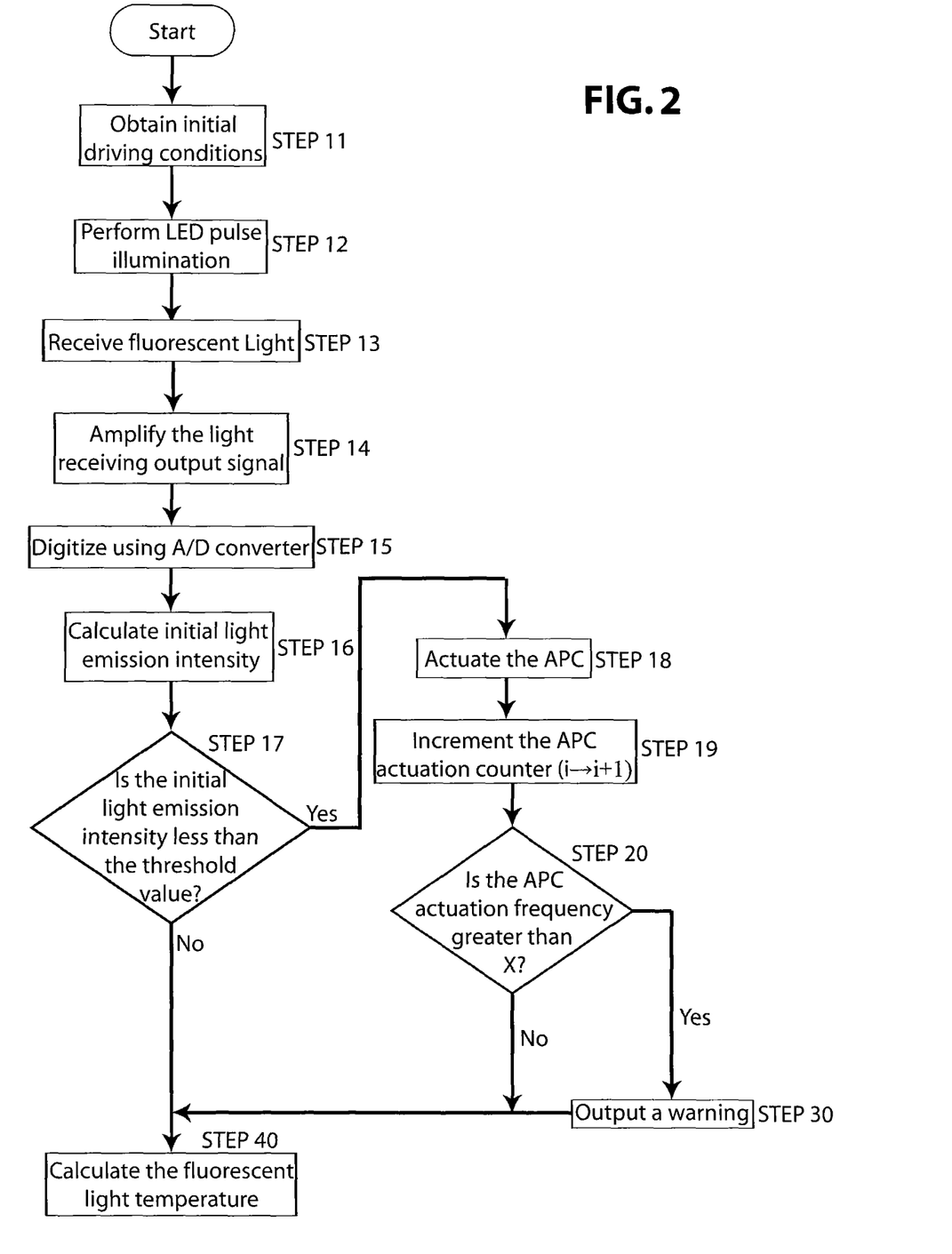
FIG. 2 is a flowchart illustrating the processing in a fluorescent light temperature sensor according to a first example of embodiment.

The specific operations of the fluorescent light temperature sensor will be explained next in reference to the flowchart in FIG. 2.

First the controller 10 obtains the initial driving conditions that are stored in advance in, for example, internal memory, not shown (Step 11). The initial driving conditions are driving conditions for the LED 2 when the intensity of the projected light of the LED 2 has been adjusted, at the time of shipping of the fluorescent light temperature sensor, so as to be a desired projected light intensity, and specifically, are a magnitude for an electric current to be applied through the driving circuit 3 to the LED 2, the initial light emission intensity of the fluorescent material 1 for the light emission under that condition, and the like.

Next, the controller 10 applies a specific pulsed electric current to the LED 2 by driving the driving circuit 3 based on the initial driving conditions thus obtained (Step 12). This causes the LED 2 to emit light at light at a predetermined light emission intensity for a predetermined interval due to the pulsed electric current, and this light is projected onto the fluorescent material 1 through the light projecting optical fiber 8a.

Next, in the controller 10, the fluorescent light from the fluorescent material 1 that is optically stimulated by the light that is projected is received by the photo diode 4 through the light receiving optical fiber 8b after the timing with which the LED 2 is extinguished (Step 13).

Next, in the controller 10, the initial light emission intensity of the fluorescent light of the fluorescent material 1 is calculated by the signal processing circuit 5 (Step 14 through 16). Specifically, the signal processing circuit 5 first amplifies the output signal that is outputted from the photo diode 4 (Step 14), and converts the amplified output signal into a digital signal through digitization with a predetermined sampling interval (Step 15). After this, the signal processing circuit 5 calculates the decay characteristics (decay curve) of the intensity of the fluorescent light of the fluorescent material 1 using this digital signal, and defines the initial value as the initial light emission intensity (Step 16).

Note that the initial value described here may use, for example, that data, from the light emission intensities that are sampled immediately after the termination of the projection of light by the LED 2, that is data immediately after the full termination of the projection of light by the LED 2.

In this case, in the "immediately after the termination of the projection of light by the LED 2," there may be cases, due to the responsiveness of the circuits, wherein the electric current provided to the LED 2 may not cut off instantaneously. Because of this, an elapsed time prior to the commencement of the initial light emission intensity measurement after the outputting of a signal for terminating the illumination (that is, and elapsed time after the termination of the projection of light from the LED 2) may be provided in advance in the measurement program, and the measurement may be performed in accordance with that measurement program.

Following this, in the controller 10, an evaluation is performed by the evaluating means 7 as to whether or not the initial light emission intensity is less than a predetermined threshold value (Step 17). Note that the predetermined threshold value is a value that is a reference for the initial light emission intensity for the initial driving conditions obtained in Step 1, and is set to, for example, a value such as the initial light emission intensity of the initial driving conditions −5%.

Furthermore, when the evaluation is that the initial light emission intensity of the fluorescent material 1 due to the projected light in the previous cycle is greater than the threshold value (Step 17: No), then the fluorescent light relaxation time is calculated from the decay characteristics calculated in Step 16, and the temperature of the temperature measurement environment containing the fluorescent material 1 is calculated from the expression (including a data table, a map, and the like) of the relationship between the fluorescent light relaxation time and the fluorescent material 1 (Step 40). The temperature thus calculated is then outputted through an output terminal or an interface, not shown.

On the other hand, if the evaluation is that the initial light emission intensity of the fluorescent material 1 due to the projected light in the previous cycle was less than the threshold value (Step 17: Yes), then the APC circuit 6 is actuated (Step 18). Specifically, the APC circuit 6 calculates an amount of compensation corresponding to the difference between the initial light emission intensity that is less than the threshold value and the initial setting intensity at the time of shipping, obtained from Step 11, and outputs an output signal, which has this amount of compensation as a control signal, to the driving circuit 3. Doing so enables the LED 2 to be driven so as to be compensated when the light emission intensity of the LED has declined due to deterioration over time, enabling the prevention of a decline in the accuracy of the measurement of the temperature, enabling the functionality that is required in the fluorescent light temperature sensor to be maintained.

At this time, in the controller 10, the APC actuation counter i, which indicates the number of times that the APC has been actuated, is incremented (Step 19). Here the APC actuation counter i is a value that is reset at predetermined time intervals (predetermined processing intervals) by a timer, not shown, and expresses the actuation frequency of the APC over the predetermined time interval.

Following this, the evaluation means 7 evaluate whether or not the incremented APC actuation counter i is greater than a specific threshold value X (Step 20). Here the specific threshold value X is set to a frequency that is a frequency at which the APC circuit 6 will be actuated in the predetermined time interval by the LED 2 approaching the end of its service life.

If it is evaluated that the APC actuation counter i is less than the threshold value X (Step 20: No), then the evaluating means 7 assume that the LED 2 is not yet approaching the end of its service life, and the temperature of the temperature measurement environment containing the fluorescent material 1 is calculated as described above (Step 40).

On the other hand, if it is evaluated that the APC actuation counter i is greater than the threshold value X (Step 20: Yes), then the LED 2 is assumed to be approaching the end of its service life (although not yet at the end of the service life), and after a warning is outputted (Step 30), the temperature of the temperature measurement environment containing the fluorescent material 1 is calculated as set forth above (Step 40).

As described above, the fluorescent light temperature sensor in the first example of embodiment is able to maintain the functionality of the temperature sensor in accordance with the deterioration of the LED 2 over time.

That is, firstly, when there is a decline in the light projection intensity due to the deterioration of the LED 2 over time, the LED 2 can be driven while compensated for this deterioration by the APC circuit 6, preventing a decline in the accuracy of the measurement of the temperature, enabling the functionality required in the fluorescent light temperature sensor to be maintained.

Secondly, by evaluating the service life of the LED 2 in advance based on the actuation frequency of the APC circuit 6, it is possible to suggest to the user the timing for changing of the LED 2, providing a trigger for changing, thereby making it possible to avoid an unexpected loss of functionality of the temperature sensor, making it possible to maintain functionality as a temperature sensor.

(Second Example of Embodiment)

Figure 3:
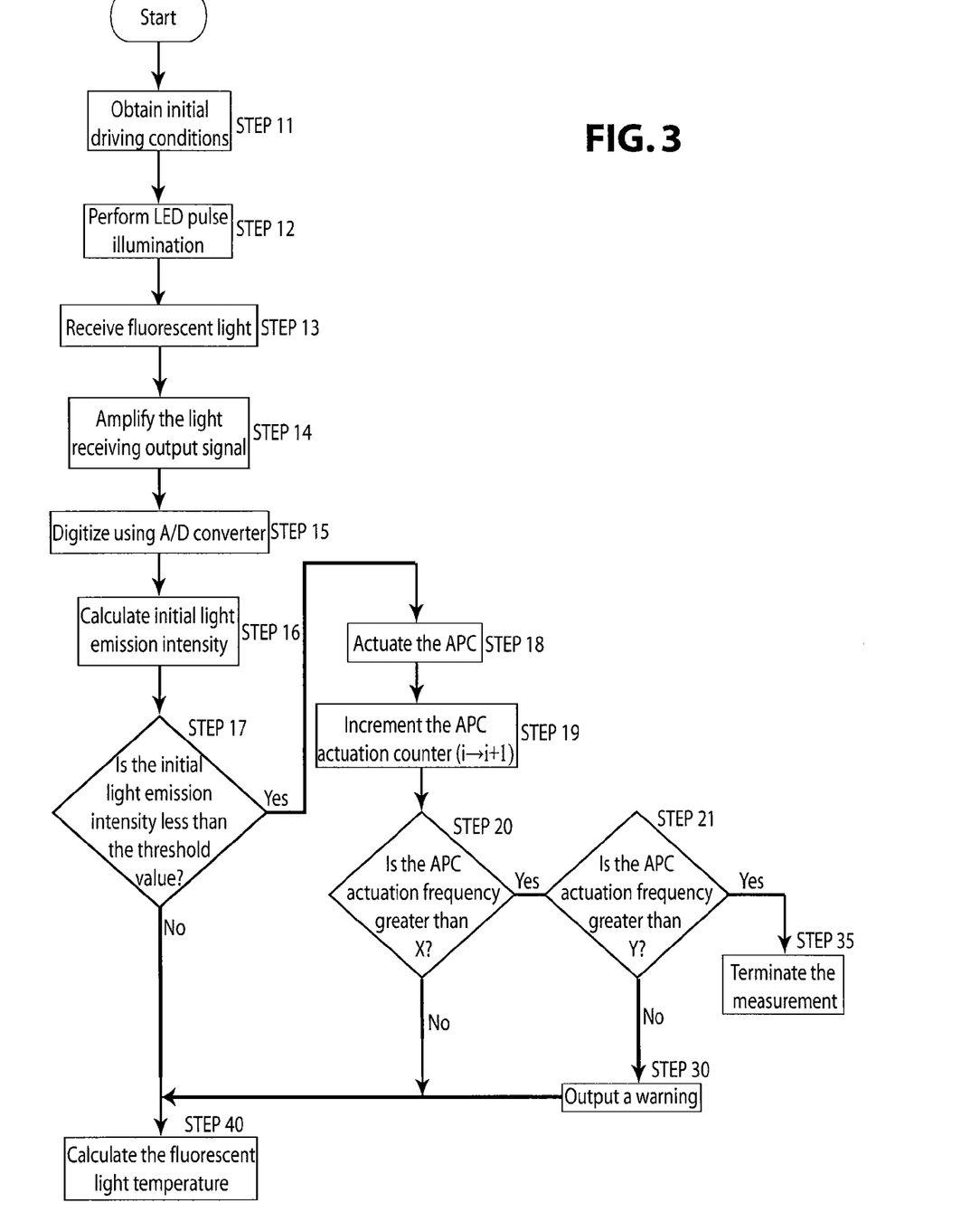
FIG. 3 is a flowchart illustrating the processing in a fluorescent light temperature sensor according to a second example of embodiment.

A modified example of the operation of the fluorescent light temperature sensor illustrated in FIG. 2 will be explained in reference to the flowchart shown in FIG. 3. Note that the processes in the flowchart in FIG. 3 differ from those of the flowchart in FIG. 2 for the first example of embodiment in only a portion of the processes; thus those processes that are identical to those in the first example of embodiment are assigned identical reference codes as in the first example of embodiment, and explanations thereof are omitted.

In the present example of embodiment, if the evaluation result in Step 20 is Yes (when the APC actuation counter i is evaluated as being greater than the threshold X), then the evaluating means 7 evaluate whether or not the incremented APC actuation counter i is less than a predetermined threshold value Y (Step 21). Here the predetermined threshold value Y is a value that is greater than the threshold value X, and is set to the frequency with which the APC circuit 6 will be actuated during the predetermined interval if the LED 2 is at the end of its service life.

If it is evaluated that the APC actuation counter i is less than the threshold value Y (Step 21: No), then the evaluating means 7 output a warning (Step 30) that the LED 2 is approaching the end of its service life (but has not yet reached the end of its service life), and the temperature of the temperature measurement environment containing the fluorescent material 1 is calculated as set forth above (Step 40).

On the other hand, if it is evaluated that the APC actuation counter i is greater than the threshold value Y (Step 21: Yes), then the evaluating means 7 terminate the measurements by the fluorescent light temperature sensor, as the LED 2 is at the end of its service life (Step 35).

The foregoing is an explanation of the operation of the fluorescent light temperature sensor as set forth in the second example of embodiment.

Specifically, in the fluorescent light temperature sensor as set forth in the second example of embodiment, threshold values are set in a stepwise manner in relation to the actuation frequency of the actuation of the APC circuit 6 and the service life of the LED 2 is evaluated in advance. Doing so enables notification in advance that the LED 2 is approaching the end of its service life, and enables the temperature measurement to be terminated if the LED 2 has reached the end of its service life.

(Third Example of Embodiment)

Figure 4:
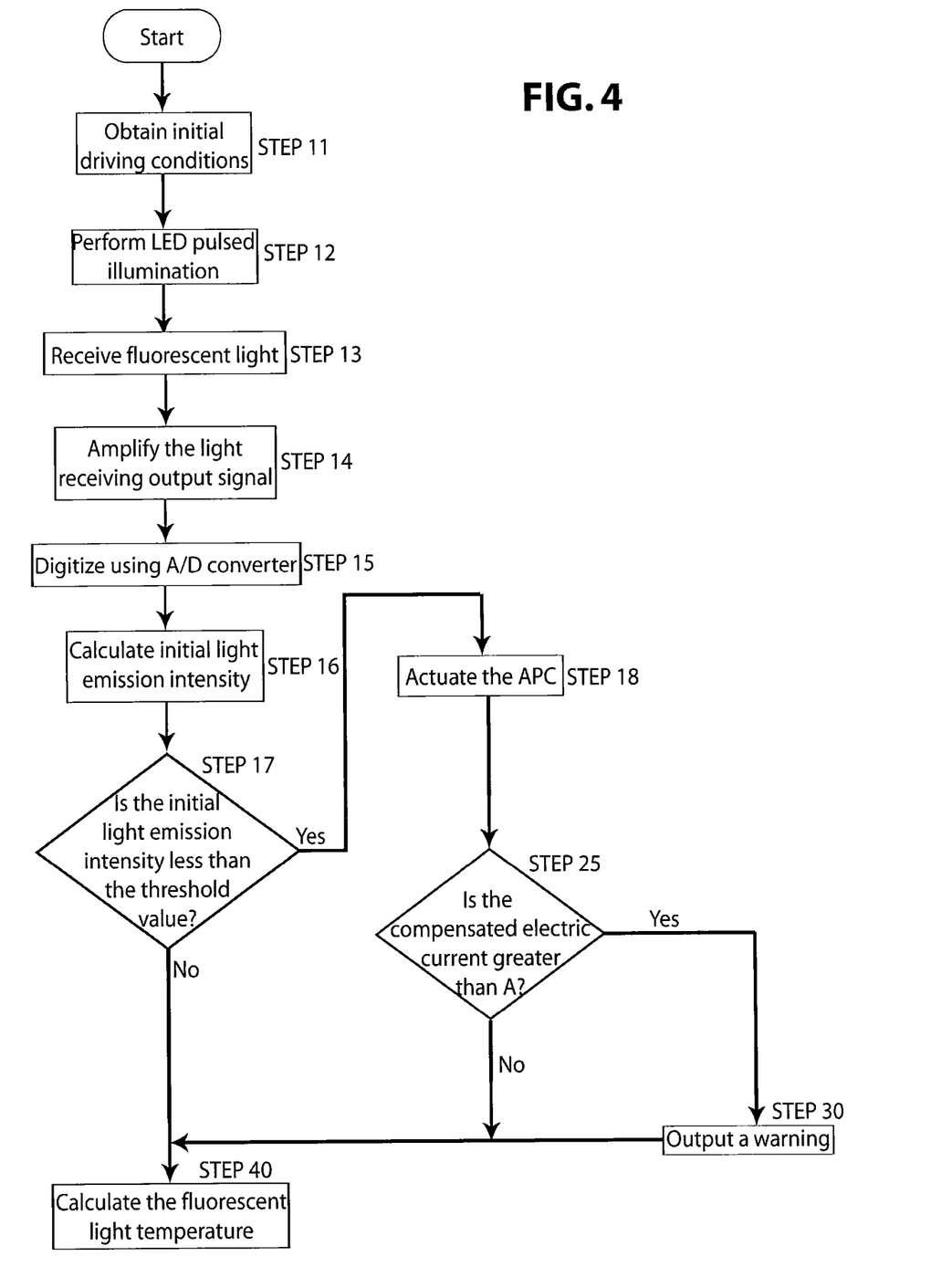
FIG. 4 is a flowchart illustrating the processing in a fluorescent light temperature sensor according to a third example of embodiment.

A modified example of the operation of the fluorescent light temperature sensor illustrated in FIG. 2 will be explained in reference to the flowchart shown in FIG. 4. Note that the processes in the flowchart in FIG. 4 differ from those of the flowchart in FIG. 2 for the first example of embodiment in only a portion of the processes; thus those processes that are identical to those in the first example of embodiment are assigned identical reference codes as in the first example of embodiment, and explanations thereof are omitted.

In the present example of embodiment, when the APC circuit is actuated in Step 18, the evaluating means 7 evaluate a controlled variable represented by the control signal that is outputted when the APC circuit 6 has been actuated, that is, evaluate whether or not the amount of compensation for the electric current that is applied to the LED 2 is greater than a predetermined threshold value A (Step 25). Here the predetermined threshold value A is a tolerance value for the amount of compensation of the electric current that is applied to the LED 2, and is set to a value for the amount of compensation when the LED 2 is approaching the end of its service life.

When the amount of compensation is less than the threshold value A (Step 25: No), then the evaluating means 7 assume that the LED is not approaching the end of its service life, and the temperature of the temperature measurement environment containing the fluorescent material 1 is calculated as set forth above (Step 40).

On the other hand, if the amount of compensation is greater than the threshold value A (Step 25: Yes), then it is assumed that the LED 2 is approaching the end of its service life (but has not yet reached the end of its service life), and after a warning is issued (Step 30), the temperature of the temperature measurement environment containing the fluorescent material 1 is calculated as set forth above (Step 40).

The foregoing is an explanation of the operation of the fluorescent light temperature sensor as set forth in the third example of embodiment.

Specifically, the fluorescent light temperature sensor as set forth in to the third example of embodiment evaluates the service life of the LED 2 based on the amount of compensation of the electric current that is applied to the LED 2. Doing so enables the service life to be evaluated based on the degree of advancement of the deterioration of the LED 2, not reflected in the actuation count for the APC circuit 6.

(Fourth Example of Embodiment)

Figure 5:
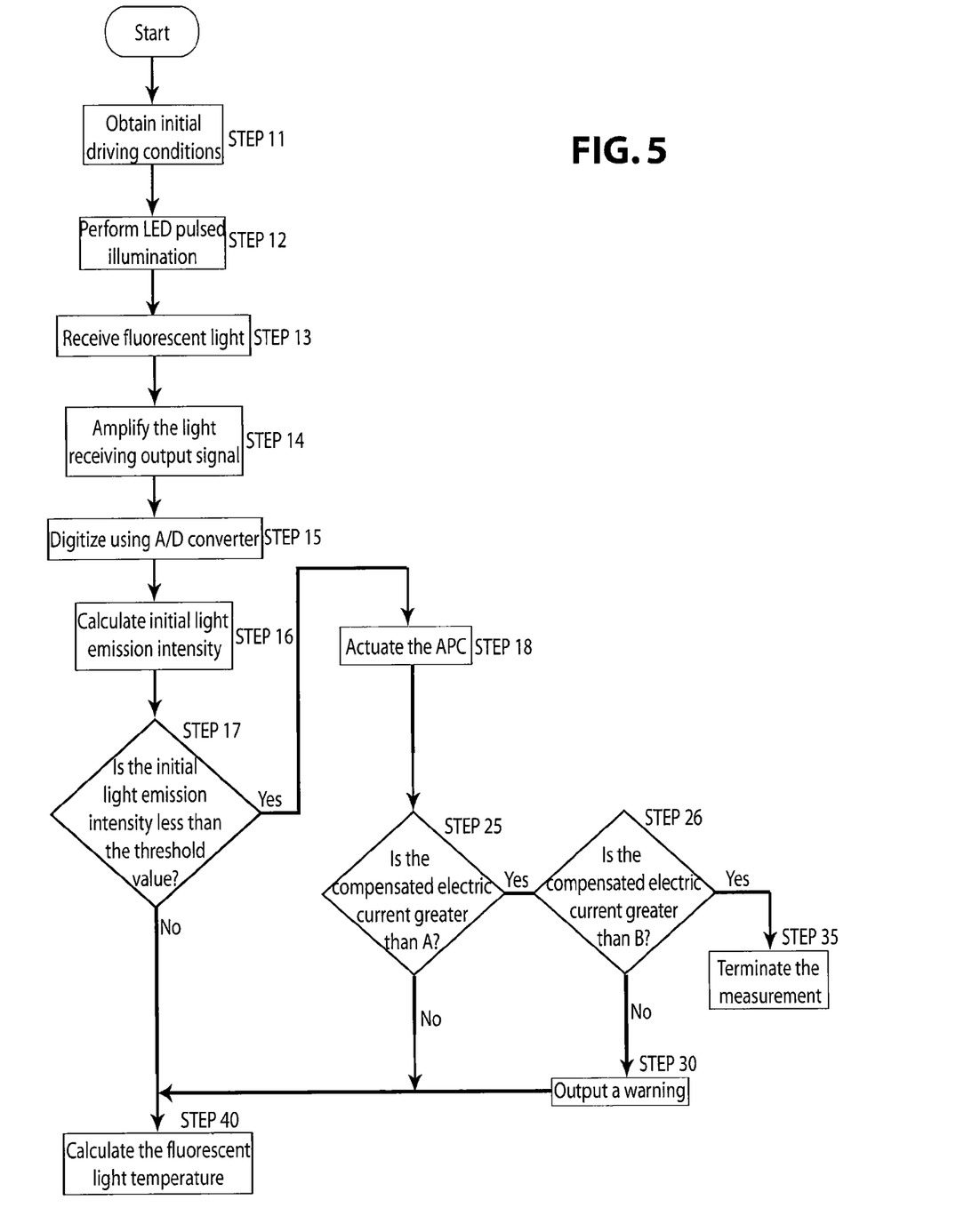
FIG. 5 is a flowchart illustrating the processing in a fluorescent light temperature sensor according to a fourth example of embodiment.

A modified example of the operation of the fluorescent light temperature sensor illustrated in FIG. 4 will be explained in reference to the flowchart shown in FIG. 5. Note that the processes in the flowchart in FIG. 5 differ from those of the flowchart in FIG. 4 for the third example of embodiment in only a portion of the processes; thus those processes that are identical to those in the third example of embodiment are assigned identical reference codes as in the third example of embodiment, and explanations thereof are omitted.

In the present example of embodiment, when the evaluation result in Step 25 is Yes (when it is evaluated that the amount of compensation to the electric current applied to the LED 2 is greater than the predetermined threshold value A), then the evaluating means 7 evaluate whether or not the amount of compensation of the electric current applied to the LED 2 is greater than a predetermined threshold value B (Step 26). Here the predetermined threshold value B is the tolerance value for the amount of compensation of the electric current applied to the LED 2, and is set to a value for the amount of compensation when the LED 2 is at the end of its service life.

Additionally, if the amount of compensation is less than the threshold value B (Step 26: No), then the evaluating means 7 assume that the LED 2 is approaching the end of its service life (but has not yet reached the end of its service life), and after a warning is issued (Step 30), the temperature of the temperature measurement environment containing the fluorescent material 1 is calculated as set forth above (Step 40).

On the other hand, if the amount of compensation is greater than the threshold value B (Step 26: Yes), then the evaluating means 7 terminate the measurements by the fluorescent light temperature sensor, as the LED 2 is at the end of its service life (Step 35).

The foregoing is an explanation of the operation of the fluorescent light temperature sensor as set forth in the fourth example of embodiment.

Specifically, in the fluorescent light temperature sensor as set forth in the fourth example of embodiment, threshold values for the amount of compensation of the electric current applied to the LED 2 are set in a stepwise manner, to perform evaluations in advance for the service life of the LED 2. Doing so enables a notification in advance that the LED 2 is approaching the end of its service life, based on the degree of advancement of deterioration of the LED 2, not reflected in the actuation frequency of the APC circuit 6, and enables the termination of the temperature measurements when the LED 2 has reached the end of its service life.

(Fifth Example of Embodiment)

Figure 6:
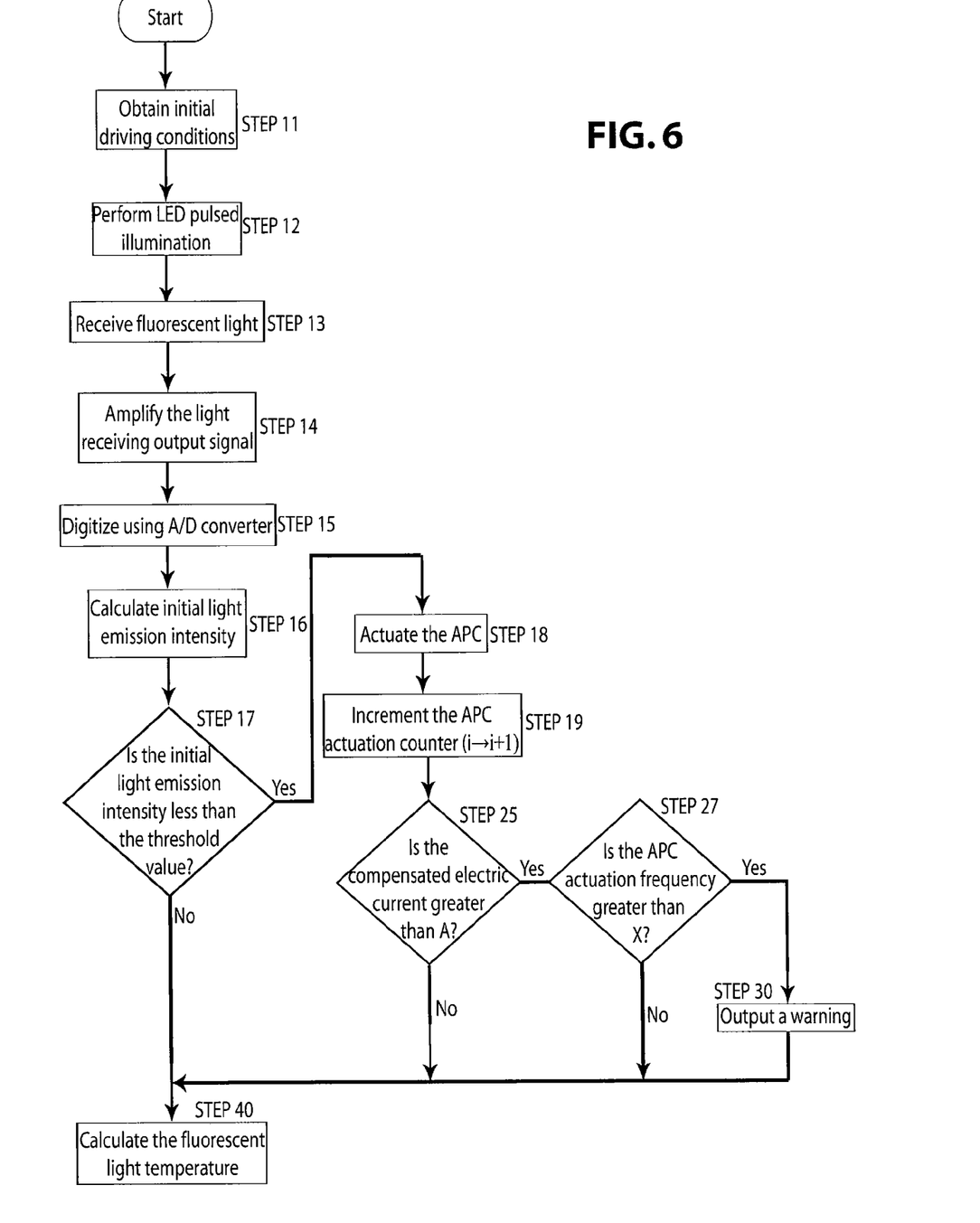
FIG. 6 is a flowchart illustrating the processing in a fluorescent light temperature sensor according to a fifth example of embodiment.

A modified example of the operation of the fluorescent light temperature sensor illustrated in FIG. 2 will be explained in reference to the flowchart shown in FIG. 6. Note that the processes in the flowchart in FIG. 6 differ from those of the flowchart in FIG. 2 for the first example of embodiment in only a portion of the processes; thus those processes that are identical to those in the first example of embodiment are assigned identical reference codes as in the first example of embodiment, and explanations thereof are omitted.

In the present example of embodiment, when, in Step 19, the APC actuation counter i that indicates the APC actuation count has been incremented, then the evaluating means 7 evaluate whether or not the controlled variable that is indicated by the control signal that is outputted when the APC circuit 6 is actuated, or in other words, the amount of compensation for the electric current that is applied to the LED 2, is above the predetermined threshold A (Step 25). Here the predetermined threshold value A is the tolerance value for the amount of compensation for the electric current that is applied to the LED 2, and is set to a value for the amount of compensation when the LED 2 is approaching the end of its service life.

When the amount of compensation is less than the threshold value A (Step 25: No), then the evaluating means 7 assume that the LED is not approaching the end of its service life, and the temperature of the temperature measurement environment containing the fluorescent material 1 is calculated as set forth above (Step 40).

On the other hand, if the amount of compensation is greater than the threshold value A (Step 25: Yes), then the evaluating means 7 evaluate whether or not the incremented APC actuation counter i is greater than the predetermined threshold value X (Step 27). Here the specific threshold value X is set to a frequency that is a frequency at which the APC circuit 6 will be actuated in the predetermined time interval by the LED 2 approaching the end of its service life.

If it is evaluated that the APC actuation counter i is less than the threshold value X (Step 27: No), then the evaluating means 7 assume that the LED 2 is not yet approaching the end of its service life, and the temperature of the temperature measurement environment containing the fluorescent material 1 is calculated as described above (Step 40).

On the other hand, if it is evaluated that the APC actuation counter i is greater than the threshold value X (Step 27: Yes), then the LED 2 is assumed to be approaching the end of its service life (although not yet at the end of its service life), and after a warning is outputted (Step 30), the temperature of the temperature measurement environment containing the fluorescent material 1 is calculated as set forth above (Step 40).

The foregoing is an explanation of the operation of the fluorescent light temperature sensor as set forth in the fifth example of embodiment.

Specifically, in the fluorescent light temperature sensor as set forth in the fifth example of embodiment, the evaluation that the LED 2 is approaching the end of its service life is performed from multiple aspects based on the amount of compensation in the electric current that is applied to the LED 2 and based on the actuation frequency of the APC circuit 6. That is, in addition to the short-term tendencies in the deterioration of the LED 2 that are reflected in the amount of compensation of the electric current that is applied to the LED 2, it is possible also to perform the evaluation as to whether or not the LED 2 is actually approaching the end of its service life accurately based on long-term trends in the deterioration of the LED 2 that are reflected in the frequency of actuation of the actuation of the APC circuit 6.

(Sixth Example of Embodiment)

Figure 7:
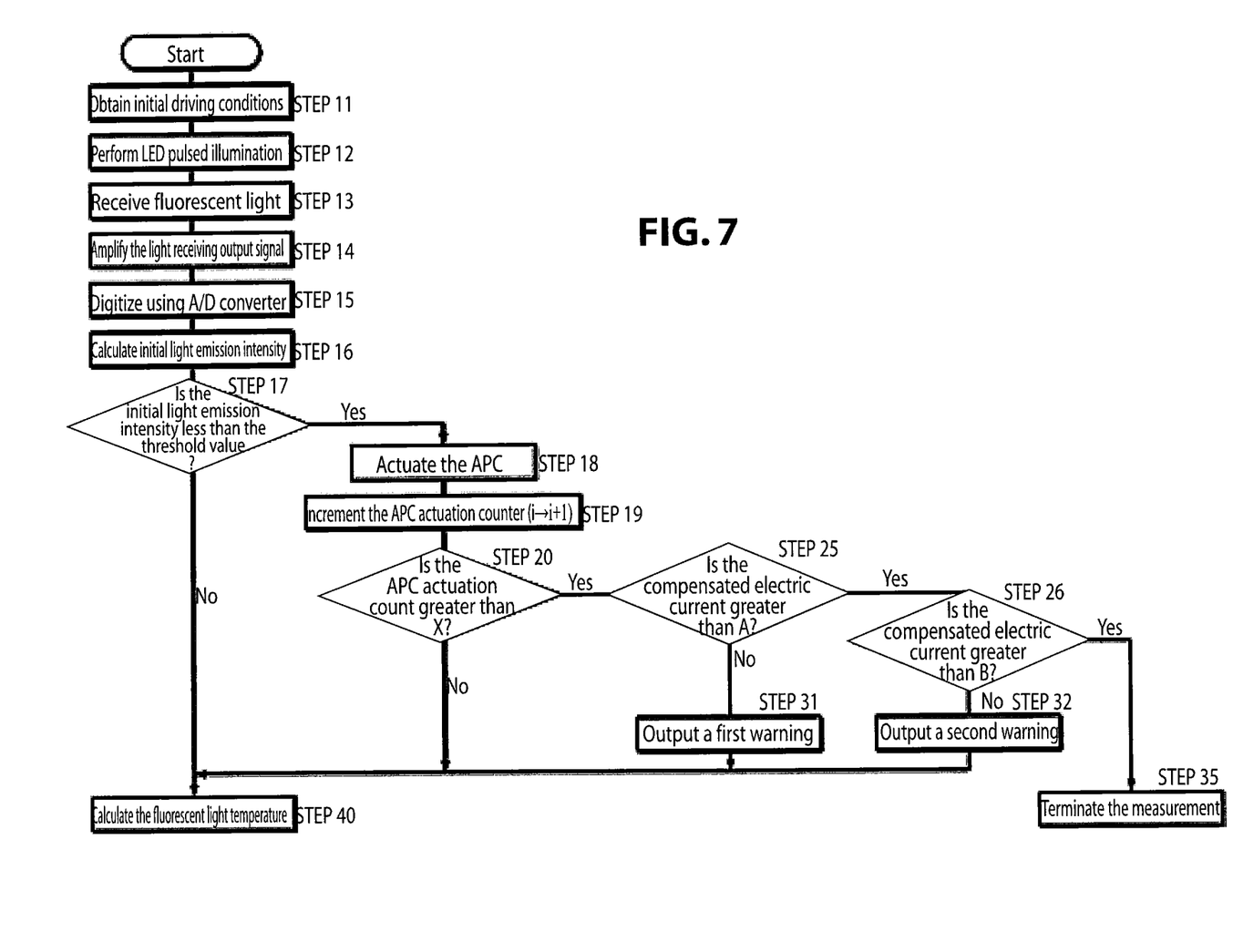
FIG. 7 is a flowchart illustrating the processing in a fluorescent light temperature sensor according to a sixth example of embodiment.

A modified example of the operation of the fluorescent light temperature sensor illustrated in FIG. 2 will be explained in reference to the flowchart shown in FIG. 7. Note that the processes in the flowchart in FIG. 7 differ from those of the flowchart in FIG. 2 for the first example of embodiment in only a portion of the processes; thus those processes that are identical to those in the first example of embodiment are assigned identical reference codes as in the first example of embodiment, and explanations thereof are omitted.

In the present example of embodiment, when the evaluation result in Step 20 is Yes (that is, when the APC actuation counter i is evaluated as being greater than the threshold value X), then the evaluating means 7 evaluate whether or not the evaluate a controlled variable represented by the control signal that is outputted when the APC circuit 6 has been actuated, that is, evaluate whether or not the amount of compensation for the electric current that is applied to the LED 2 is greater than a predetermined threshold value A (Step 25). Here the predetermined threshold value A is a tolerance value for the amount of compensation of the electric current that is applied to the LED 2, and is set to a value for the amount of compensation when the LED 2 is approaching the end of its service life.

If the amount of compensation is less than the threshold value A (Step 25: No), then the evaluating means 7 assume, based on the actuation of the APC circuit 6, that it is possible that the LED 2 is approaching the end of its service life, and after performing a first warning output (Step 31), the temperature of the temperature measurement environment containing the fluorescent material 1 is calculated as set forth above (Step 40). Here the first warning output is a warning that indicates that there is the possibility that the LED 2 is approaching the end of its service life.

On the other hand, if the amount of compensation is greater than the threshold value A (Step 25: Yes), then the evaluating means 7 evaluate whether or not the amount of compensation of the electric current that is applied to the LED 2 is greater than the predetermined threshold value B (Step 26). Here the predetermined threshold value B is the tolerance value for the amount of compensation of the electric current applied to the LED 2, and is set to a value for the amount of compensation when the LED 2 is at the end of its service life.

Additionally, if the amount of compensation is less than the threshold value B (Step 26: No), then the evaluating means 7 assume that the LED 2 is approaching the end of its service life (but has not yet reached the end of its service life), and after a second warning is issued (Step 32), the temperature of the temperature measurement environment containing the fluorescent material 1 is calculated as set forth above (Step 40). Here the second warning output is a warning indicating that it is certain that the LED 2 is approaching the end of its service life.

On the other hand, if the amount of compensation is greater than the threshold value B (Step 26: Yes), then the evaluating means 7 terminate the measurements by the fluorescent light temperature sensor, as the LED 2 is at the end of its service life (Step 35).

The foregoing is an explanation of the operation of the fluorescent light temperature sensor as set forth in the sixth example of embodiment.

Specifically, the fluorescent light temperature sensor as set forth in the sixth example of embodiment evaluates that the possibility (certainty) that the LED 2 is approaching the end of its service life is low based on the actuation frequency of the APC circuit 6 and on the amount of compensation for the electric current that is applied to the LED 2. That is, an evaluation of the possibility that the LED 2 is approaching the end of its service life is performed based on the long-term trend in the deterioration of the LED 2 that is reflected in the actuation frequency of the actuation of the APC circuit 6 which is outputted as a first warning. In addition, an evaluation that there is a high probability that the LED 2 is approaching the end of its service life is performed based on the short-term tendency in the deterioration of the LED 2 that is reflected in the amount of compensation of the electric current that is applied to the LED 2, and is outputted as a second warning. Furthermore, an evaluation as to whether or not the LED 2 has reached the end of its service life is performed based on the amount of compensation for the electric current that is applied to the LED 2. This enables an increase in the evaluation accuracy regarding the service life of the LED 2, enabling stepwise notifications regarding the service life in advance, and enabling the temperature measurements to be terminated when the LED 2 reaches the end of its service life.

Note that while in each of the examples of embodiment set forth above the determining means 7 performed evaluations in advance on the service life of the LED 2 based on the frequency (the count per unit time) and the magnitude (the magnitude of the amount of compensation) of the control signal outputted to the driving circuit 3 from the APC circuit 6, the present invention is not limited thereto, and, conversely, maybe based on other than the control signal that is outputted to the driving circuit 3 from the APC circuit 6. For example, the evaluation that is performed in advance for the service life of the LED 2 may be based on a cumulative output count by counting the number of times that the control signal is outputted.

Furthermore, while in the present examples of embodiment the explanations were for the case wherein each of the circuits 3, 5, and 6 were restructured as digital circuits, these may be structured from analogous analogue circuits instead.

The invention claimed is:

1. A fluorescent light temperature sensor, comprising:
a fluorescent material;
a light projecting element projecting light onto the fluorescent material;
a driving circuit driving the light projecting element;
a light receiving element receiving fluorescent light emitted from the fluorescent material and producing an output signal based on the fluorescent light;
a signal processing circuit generating a temperature signal, for a temperature measurement environment separate from the light projecting element, from the output signal of the light receiving element;
a controlling circuit controlling the driving of the driving circuit through sending a control signal to the driving circuit so as to maintain a uniform intensity for the fluorescent light of the fluorescent material based on the output signal from the light receiving element; and
an evaluating device evaluating the service life of the light projecting element in advance based on a control signal from the controlling circuit,
wherein the control signal is based on at least one of an actuation frequency of the controlling circuit and a compensating current provided to the light projecting element.

2. The fluorescent light temperature sensor as set forth in claim 1, wherein:
the driving circuit drives the light projecting element so as to project light at uniform intervals; and
the controlling circuit controls the intensity of the projected light in one cycle based on the intensity of the fluorescent light of the fluorescent materials due to the projected light in the previous cycle.

3. The fluorescent light temperature sensor as set forth in claim 1, wherein: the evaluating device evaluates the service life of the light projecting element in advance based on the frequency of outputting of the control signal per unit time.

4. The fluorescent light temperature sensor as set forth in claim 1, wherein: the evaluating device evaluates the service life of the light projecting element in advance based on a controlled variable expressed by the control signal.

5. The fluorescent light temperature sensor as set forth in claim 1, wherein the evaluating device first determines the actuation frequency of the controlling circuit and then determines the compensating current.

6. The fluorescent light temperature sensor as set forth in claim 5, wherein the evaluating device only generates a warning when the control signal is based only on the actuation frequency.

7. The fluorescent light temperature sensor as set forth in claim 6, wherein the evaluating device generates one of a warning or a termination of generating the temperature control signal when the control signal is based on both the actuation frequency and the compensating current.

* * * * *